United States Patent

Ikuta et al.

(10) Patent No.: US 7,905,440 B2
(45) Date of Patent: Mar. 15, 2011

(54) FISHING REEL, FISHING DATA DISPLAY DEVICE, AND FISHING DATA DISPLAY SYSTEM

(75) Inventors: Takeshi Ikuta, Sakai (JP); Ken'ichi Kawasaki, Sakai (JP); Shouoji Nakagawa, Sakai (JP); Yasuhiro Hitomi, Sakai (JP); Noboru Sakaguchi, Sakai (JP); Kazuhito Yamamoto, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/261,035

(22) Filed: Oct. 30, 2008

(65) Prior Publication Data
US 2009/0050725 A1    Feb. 26, 2009

Related U.S. Application Data

(62) Division of application No. 11/039,867, filed on Jan. 24, 2005, now Pat. No. 7,461,805.

(30) Foreign Application Priority Data

Feb. 3, 2004 (JP) .................. 2004-026900

(51) Int. Cl.
*A01K 89/00* (2006.01)
*A01K 89/015* (2006.01)
(52) U.S. Cl. .......... 242/223; 242/310; 242/323; 33/713; 33/732; 43/4
(58) Field of Classification Search .................. 242/223, 242/250, 257, 305, 322, 323, 309; 33/713, 33/715, 719, 720, 732, 733, 1 PT
See application file for complete search history.

(56) References Cited

U.S. PATENT DOCUMENTS

| | | | |
|---|---|---|---|
| 4,261,528 A | 4/1981 | McKinney | |
| 4,697,758 A | 10/1987 | Hirose et al. | |
| 5,639,038 A * | 6/1997 | Hirose | 242/223 |
| 5,782,033 A * | 7/1998 | Park et al. | 43/4 |
| 6,053,443 A * | 4/2000 | Nanbu et al. | 242/223 |
| 6,056,218 A * | 5/2000 | Nanbu | 242/223 |
| 6,126,103 A | 10/2000 | Nanbu | |
| 6,253,461 B1 | 7/2001 | Fischer | |
| 6,584,722 B1 | 7/2003 | Walls et al. | |
| 7,108,213 B2 | 9/2006 | Hitomi et al. | |
| 7,559,499 B2 * | 7/2009 | Nakagawa et al. | 242/246 |
| 2001/0042805 A1 | 11/2001 | Nakagawa et al. | |
| 2002/0053617 A1 | 5/2002 | Nanbu | |
| 2002/0104911 A1 | 8/2002 | Nishimura | |
| 2005/0162976 A1 | 7/2005 | Kuriyama et al. | |
| 2005/0218256 A1 | 10/2005 | Ikuta et al. | |
| 2009/0050725 A1* | 2/2009 | Ikuta et al. | 242/323 |

(Continued)

FOREIGN PATENT DOCUMENTS

EP    1402774 A    3/2004

(Continued)

*Primary Examiner* — Evan H Langdon
(74) *Attorney, Agent, or Firm* — Shinjyu Global IP

(57) ABSTRACT

A fishing reel 100 includes a data communication unit 44 capable of wirelessly transmitting terminal tackle water depth data to a data communication unit 66 of a fishing data display device 60, which is arranged outside of a fishing reel 100. The fishing data display device 60 includes a display unit 65 that displays the terminal tackle water depth data obtained from the data communication unit 44 and fish depth data obtained from a data communication unit 91 of a fish finder 90. The fisherman is capable of easily performing jigging with a fishing reel, as well as ascertaining the water depth of terminal tackle.

10 Claims, 8 Drawing Sheets

FOREIGN PATENT DOCUMENTS

| | | |
|---|---|---|
| JP | 2002-027878 A1 | 1/2002 |
| JP | 2002-125545 A | 5/2002 |
| JP | 2003-111 A | 1/2003 |
| JP | 2003-111 A | 7/2003 |
| JP | 2003-235412 A1 | 8/2003 |
| JP | 2003-284470 A1 | 10/2003 |

* cited by examiner

FISHING REEL, FISHING DATA DISPLAY DEVICE, AND FISHING DATA DISPLAY SYSTEM

CROSS-REFERENCE TO RELATED APPLICATIONS

This application is a Divisional Application of U.S. patent application Ser. No. 11/039,867 filed on Jan. 24, 2005, now U.S. Pat. No. 7,461,805. The entire disclosure of U.S. patent application Ser. No. 11/039,867 is hereby incorporated herein by reference.

This application claims priority under 35 U.S.C. §119 to Japanese Patent Application No. 2004-026900 filed on Feb. 3, 2004. The entire disclosure of Japanese Patent Application No. 2004-026900 is hereby incorporated herein by reference.

BACKGROUND OF THE INVENTION

1. Field of the Invention

The present invention relates to a fishing reel, and more particularly to a fishing reel that does not have a display unit capable of displaying terminal tackle water depth data.

2. Background Information

Generally, a fishing reel includes a reel unit, a spool that is rotatably mounted on the reel unit, and a handle assembly for rotating the spool. The spool is mounted on a spool shaft that is supported by the reel unit, and the handle is non-rotatably mounted on a handle shaft that is disposed in parallel with the spool shaft.

With these types of fishing reels, a counter reel is known in which a water depth measurement portion is mounted on the reel unit. Such water depth measurement portion serves to measure the water depth of the terminal tackle (see, for example, Japanese Laid-Open Patent Application No. 2003-284470). In this type of counter reel, a display unit composed of a liquid crystal display capable of displaying data of the water depth of the terminal tackle is arranged on an upper surface of the reel unit.

On the other hand, many well known small fishing reels used for jigging do not have a display unit arranged thereon as in the case of a counter reel (see, for example, Japanese Laid-Open Patent Application No. 2003-235412). With this type of jigging fishing reel, the entire reel can be reduced in size, and jigging can be easily performed, because a display unit is not arranged on the reel unit.

Because this type of jigging fishing reel does not have a display unit arranged on the reel unit, the water depth of the terminal tackle cannot be ascertained. Accordingly, jigging fishing reels are known that can be coupled to separate display unit on the exterior of the reel, and the display unit and the reel are connected by a cord (see, for example, Patent Japanese Laid-Open Patent Application No. 2002-27878). With this type of fishing reel, the water depth of the terminal tackle can be ascertained because the display unit is coupled to the fishing reel on the exterior of the reel through the cord.

With a conventional fishing reel that is coupled to a display unit on the exterior of the reel, the cord that connects the display unit and the reel will be an impediment when performing jigging. Thus, if the cord is an impediment, it may not be possible to perform jigging well, such as fine jerking movements and the like.

In view of the above, it will be apparent to those skilled in the art from this disclosure that there exists a need for an improved fishing reel, a display unit, and a fishing data display system that overcome the problems of the conventional art. This invention addresses this need in the art as well as other needs, which will become apparent to those skilled in the art from this disclosure.

SUMMARY OF THE INVENTION

The present invention enables a fisherman to easily perform jigging with a fishing reel, as well as ascertain the water depth of the terminal tackle.

One aspect of the present invention is a fishing reel that is adapted to be used with an exterior unit, and a fishing line having a terminal tackle at its end that is adapted to be wound around the fishing reel. The fishing reel includes a reel unit; a spool that is rotatably mounted on the reel unit for winding the fishing line; a water depth measurement unit configured to measure a water depth of the terminal tackle and produce a water depth datum; and a first data transmission unit configured to wirelessly transmit the water depth datum to the exterior unit.

This fishing reel includes a first wireless transmission unit capable of wirelessly and externally transmitting a terminal tackle water depth datum. The first wireless transmission unit transmits and receives in a comparatively narrow range capable of being used on board a boat, and which employs a wireless system such as UWB (ultra wide band) wireless, Bluetooth, or the like. Here, by providing a fishing data display device that is capable of displaying the terminal tackle water depth data separately from the fishing reel, the size of the fishing reel can be kept small, while allowing the fisherman to ascertain the water depth of the terminal tackle. Furthermore, by wirelessly connecting the fishing reel and the external fishing data display device, it will be no longer necessary to provide a cord to connect the fishing reel and an external fishing data display device as in the conventional art. Thus, jigging can be easily performed.

According to another aspect of the present invention, the fishing reel further includes a first electrical power supply unit arranged on the reel unit which supplies electricity to the first data transmission unit. Here, electrical power for performing wireless communication can be supplied by the first electrical power supply unit. Examples of the first electrical power supply unit include a battery such as a button battery, an electricity storage element, or the like that is arranged on the inside or outside of the reel unit, a cord connected to the battery, a solar battery arranged on the exterior of the reel unit, or the like.

According to another aspect of the present invention, the fishing reel further includes a case member that is made of a synthetic resin and is arranged on the reel unit. The case member is capable of accommodating the first wireless transmission unit in an interior of the case member. Here, by providing a cover member that can cover, for example an entire structure of the first wireless transmission unit including an antenna with a case member made of a synthetic resin, interference during wireless communication can be prevented.

The fishing reel according to another aspect of the present invention is a fishing reel in which the case member is detachably mounted to the reel unit. Here, because the case member is detachably mounted to the reel unit, the case member can be removed when the first wireless transmission unit is not used.

The fishing reel according to yet another aspect of the present invention is a fishing reel in which the water depth measurement unit includes a sensor that is configured to detect the number of spool rotations, and the terminal tackle water depth datum is obtained based on the number of spool rotations. Here, because the number of spool rotation can be wirelessly transmitted as, for example, the water depth datum, the terminal tackle water depth datum can be easily obtained.

According to still another aspect of the present invention, the fishing reel further includes a control unit that stores map data. The water depth datum is obtained based on the number of spool rotations and the map data. Here, because the number of spool rotations will be converted to the terminal tackle water depth data with the map data stored in the control unit, highly accurate terminal tackle water depth data with comparatively few discrepancies can be obtained.

The fishing reel according to another aspect of the present invention is a fishing reel in which the control unit is provided in an interior of the reel unit. Here, for example, when a fishing data display device capable of displaying terminal tackle water depth data is arranged separately from the fishing reel, because it will be no longer necessary to arrange the control unit on a fishing data display device, a conventional fishing data display device that does not include a control unit can be connected the fishing reel.

According to another aspect of the present invention, there is provided a fishing data display device in which the fishing data display device is connected to a fishing reel. The fishing data display device includes a body member, display unit arranged on the body member, a first wireless reception unit configured to wirelessly receive a water depth datum from a first wireless transmission unit of the fishing reel, and a first display unit configured to display the water depth datum received by the first wireless reception unit.

This fishing data display device includes a first wireless reception unit that is capable of wirelessly receiving terminal tackle water depth data transmitted from the first wireless transmission unit of the fishing reel. Here, by arranging the fishing data display device separately from the fishing reel, the size of the fishing reel can be kept small, while allowing the fisherman to ascertain the water depth of the terminal tackle. Furthermore, by wirelessly connecting the fishing reel and the fishing data display device, it will no longer be necessary to provide a cord between the fishing reel and the fishing data display device as in the conventional art. Thus, jigging can be easily performed.

According to another aspect of the present invention, the fishing data display device further includes a second display unit configured to display data obtained from a data collection device that is connected to the body member of the fishing data display device. Here, the fishing data display device can quickly obtain various data from the data collection device that is separate from the fishing reel as well as the terminal tackle water depth data.

According to yet another aspect of the present invention, the fishing data display device further includes a data storage unit configured to store various data in the body member. Here, for example, by providing a data storage unit that stores various data, past data can be referenced and a history can be displayed.

According to a further aspect of the present invention, the fishing data display device further includes a data input unit configured to receive input of various data. Here, for example, by providing a data input unit that receives various data, various data can be corrected and supplemented, and detailed settings can be performed on the fishing data display device.

According to another aspect of the present invention, the fishing data display device further includes a second power supply unit that supplies electricity to the first wireless reception unit. Here, electrical power for performing wireless communication can be supplied by the second electrical power supply unit. Examples of the second electrical power supply unit includes a battery such as an electricity storage element or the like that is arranged on the inside or outside of the body member, a cord connected to the battery, a solar battery arranged on the exterior of the body member, or the like.

The fishing data display device according to still another aspect of the present invention is a fishing data display device in which the first wireless reception unit is provided in an interior of the body member. Here, by installing the first wireless reception unit in the body member, the entire structure of the fishing data display device can be made more compact.

The fishing data display device according to yet another aspect of the present invention is a fishing data display device in which the first wireless reception unit is provided outside of the body member. Here, for example, a wireless function can be added later as an option to a fishing data display device that does not originally have a wireless function.

According to another aspect of the present invention, the fishing data display device further includes a cord for supplying electricity, and a second power supply unit that supplies electricity to the first wireless reception unit. The first wireless reception unit and the second power supply unit are connected to the body member via the cord such that the first wireless reception unit and the first display unit communicate various data via the cord. Here, in a fishing data display device that does not have a wireless function, a wireless function can be added without increasing the size of the body member by arranging the first wireless reception unit along the cord.

According to another aspect of the present invention, there is provided a fishing data display system that displays water depth data of a terminal tackle attached to an end of a fishing line. The fishing data display system includes a fishing reel and fishing data display device configured to be connected to the fishing reel. The fishing reel includes a reel unit, a spool that is rotatably mounted on the reel unit for winding the fishing line, a water depth measurement unit configured to measure the water depth of the terminal tackle and produce a water depth datum, and a first data transmission unit configured to wirelessly transmit the water depth datum. The fishing data display device a body member, a display unit arranged on the body member, a first wireless reception unit configured to wirelessly receive a water depth datum from the first wireless transmission unit of the fishing reel, and a first display unit configured to display the water depth datum received by the first wireless reception unit.

This fishing data display system includes a fishing reel having a first wireless transmission unit capable of wirelessly transmitting terminal tackle water depth data, and a fishing data display device having a first wireless reception unit capable of wirelessly receiving terminal tackle water depth data transmitted from the first wireless transmission unit. Here, by arranging the fishing data display device separately from the fishing reel, the size of the fishing reel can be kept small, while allowing the fisherman to ascertain the water depth of the terminal tackle. Furthermore, by wirelessly connecting the reel and the external display device, it will no longer be necessary to provide a cord between the fishing reel and the fishing data display device as in the prior art. Thus, jigging can be easily performed.

The fishing data display system according to another aspect of the present invention is a fishing data display system in which the fishing data display device further includes a second display unit configured to display data obtained from a fish finder that is connected to the body member of the fishing data display device. The fish finder is configured to collect data related to fish school locations. Here, for example, the terminal tackle water depth data can be superimposed on the fish school data to unitarily display various data.

The fishing data display system according to another aspect of the present invention is a fishing data display system in which the fishing data display device further includes a second display unit configured to display data obtained from a data collection device that is connected to the body member of the fishing data display device, the data collection device further includes a second wireless transmission unit capable of wirelessly transmitting various data, and the fishing data display device further includes a second wireless reception unit capable of wirelessly receiving various data transmitted from the second wireless transmission unit. Here, by wirelessly connecting not only the fishing reel and the fishing data display device, but also the data collection device and the fishing data display device, the fishing data display device can be used in any location.

The fishing data display system according to another aspect of the present invention is a fishing data display system in which the fishing data display device further includes a third wireless transmission unit capable of wirelessly transmitting various command data, and the fishing reel further includes a third wireless reception unit capable of wirelessly receiving various command data transmitted from the third wireless transmission unit. Here, because wireless communication can be performed from the fishing data display device to the fishing reel, the fishing reel can be controlled from, for example, the fishing data display device.

The fishing data display system according to yet another aspect of the present invention is a fishing data display system in which the first data transmission unit transmits the terminal tackle water depth data of the fishing reel in accordance with the command data transmitted by the third wireless reception unit. Here, by wirelessly communicating various command data from the fishing data display device when terminal tackle water depth datum is needed, the terminal tackle water depth data can be obtained at any desired timing.

According to another aspect of the present invention, the fishing data display system further includes a control unit that stores map data. The water depth datum is obtained based on the number of spool rotations and the map data. The control unit is provided in an interior of the body member of the fishing data display device. Here, by arranging the control unit on the fishing data display device, the control structure of the fishing reel can be simplified, and thus the consumption of the electricity can be reduced. Because of this, even with a configuration in which, for example, a comparatively small amount of electricity is obtained from the rotation of the spool, it is possible to drive the first wireless transmission unit and other units.

The fishing data display system according to another aspect of the present invention is a fishing data display system in which the fishing data display device further includes a cord for supplying electricity, and a second power supply unit that supplies electricity to the first wireless reception unit. The first wireless reception unit and the second power supply unit are connected to the body member via the cord such that the first wireless reception unit and the first display unit communicate various data via the cord. The control unit is provided outside of the body member. Here, because it will no longer be necessary to arrange the control unit on both the reel unit of the fishing reel and the body member of the fishing data display device, a conventional fishing data display device that does not have a control unit can be used in the fishing data display system of the present invention. Also, because the control structure of the fishing reel can be simplified, consumption of the electricity of the various control structures can be reduced.

These and other features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF EXAMPLE EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
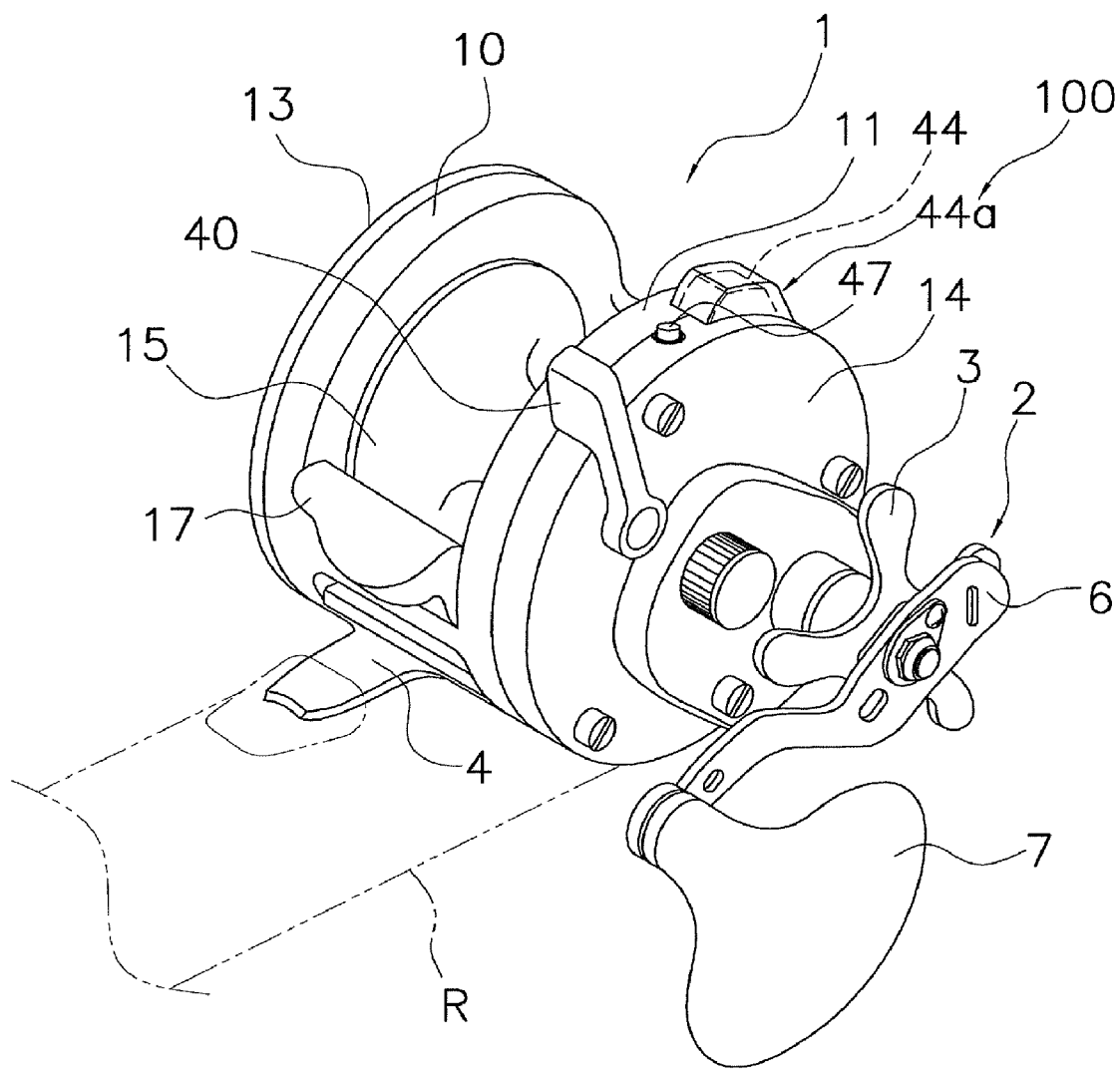
FIG. 1 is an oblique view of a fishing reel in accordance with the first embodiment of the present invention.

A fishing reel in which an embodiment of the present invention has been adopted is, as shown in FIG. 1, a small and round dual bearing reel capable of jigging, and is a type of reel that does not have a display unit capable of displaying terminal tackle water depth data. This reel includes a reel unit 1, a handle assembly 2 for rotating a spool that is disposed on one side of the reel unit 1, and a star drag 3 that is disposed at the reel unit 1 side of the handle assembly 2.

Figure 2:
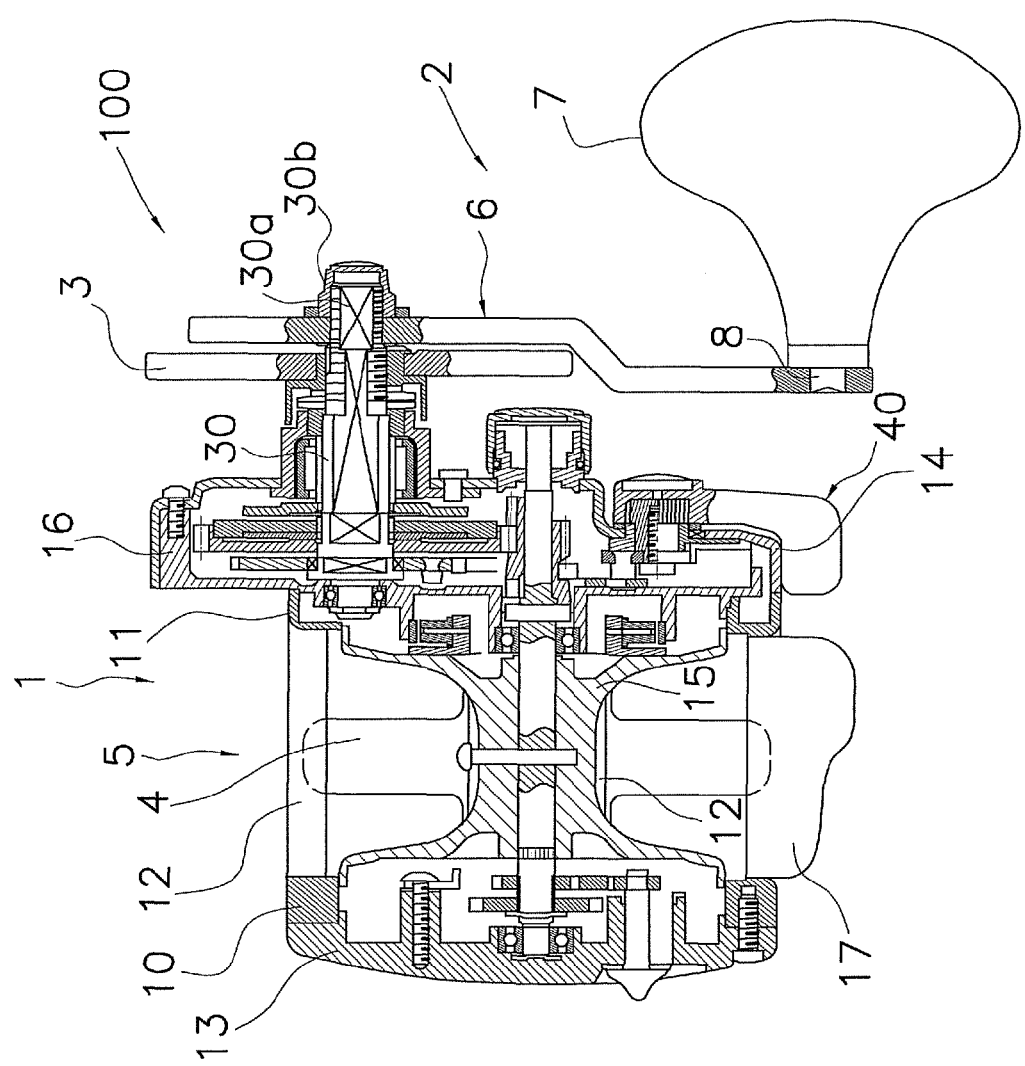
FIG. 2 is a cross-sectional view of the fishing reel in accordance with the first embodiment of the present invention.
Figure 3:
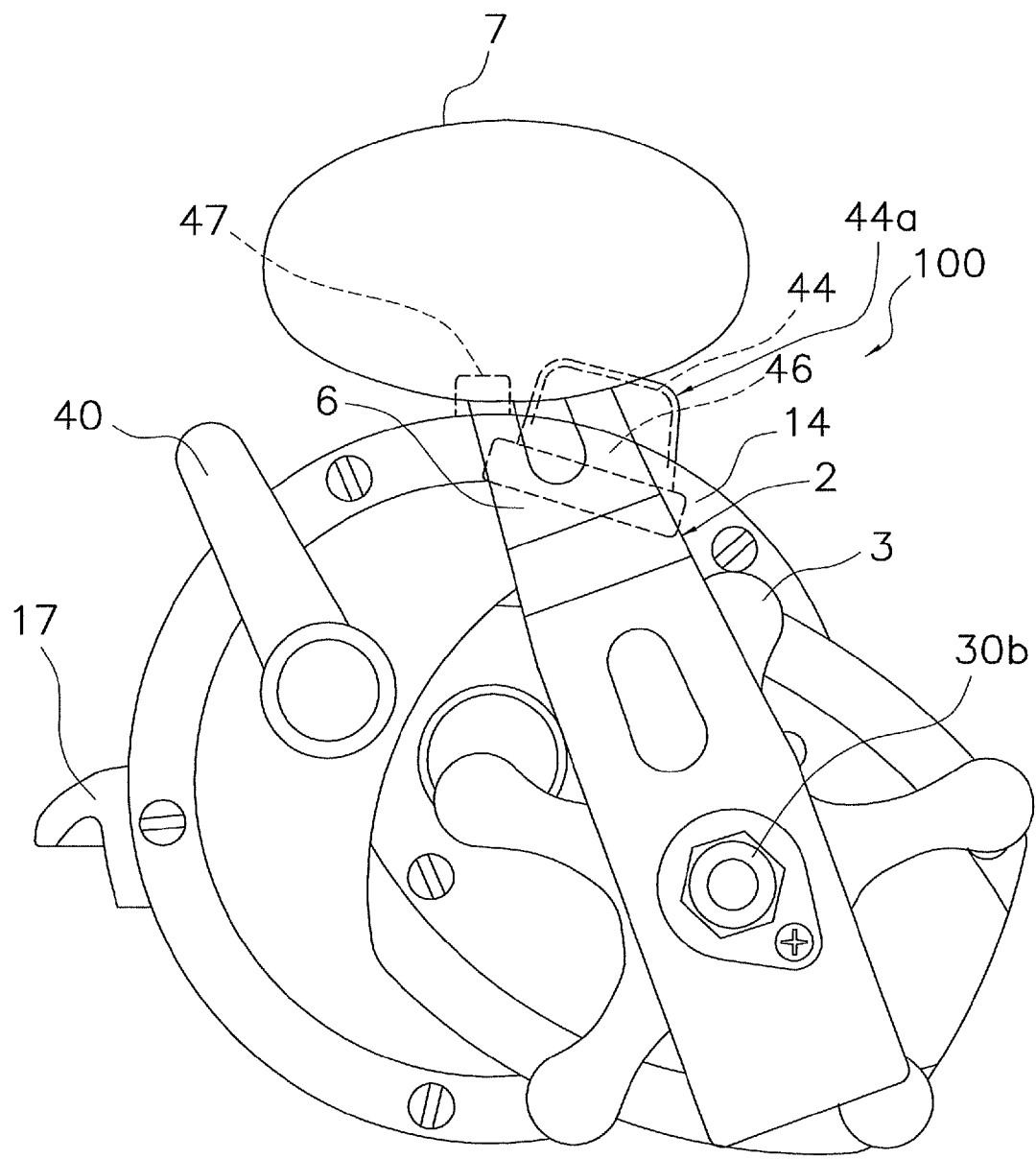
FIG. 3 is a lateral view of the fishing reel in accordance with the first embodiment of the present invention.

As shown in FIG. 1, a spool 15 that serves to wind up or release fishing line is rotatably mounted on the reel unit 1, and the reel unit 1 is attached to a fishing rod R with a rod attachment leg 4. The reel unit 1 includes, as shown in FIG. 2, a frame 5 having a first side plate 10 and a second side plate 11 that are disposed from left to right so as to have a predetermined gap therebetween and a plurality of connection members 12 for connecting the first side plate 10 and the second side plate 11, a first side cover 13 and a second side cover 14 mounted on both sides of the frame 5, and a mechanism mounting plate 16 mounted on the second side cover 14. The mechanism mounting plate 16 is in contact with the second side plate 11, and a space is formed between the mechanism mounting plate 16 and the second side cover 14 in order to accommodate various mechanisms. In addition, a clutch lever 40 is pivotally mounted on the rear of the second side cover 14 of the reel unit 1, and serves to operate a clutch mechanism (not shown in the figures). Furthermore, as shown in FIGS. 1 and 3, a data communication unit 44 capable of wirelessly outputting terminal tackle water depth data to a later-described data display device 60 (see FIGS. 4 and 5) that is arranged on the exterior of the fishing reel 100, and a switch operation unit 47 that turns the data communication unit 44 on and off, are attached to the front of the second side cover 14 of the reel unit 1 so that they are exposed. The data communication unit 44 includes a first data transmission unit 44a.

The frame 5 is obtained by die-casting, and the second side cover 14 is obtained by press-forming sheet metal. The first side plate 10, the second side plate 11, and the first side cover 13 form a circular shape when viewed laterally, and the outer peripheral faces are machined using, for example, a lathe or the like. The second side cover 14 and the mechanism fitting plate 16 have, as shown in FIGS. 2 and 3, a shape in which a part of the circular shape projects radially outward when viewed laterally. A mounting portion of a handle shaft 30 (see FIG. 2) also projects outward in the axial direction from the center of the second side cover 14.

The connection members 12 are plate-shaped members that are formed along the outer circumferences of the first side plate 10 and the second side plate 11 and are formed integrally with the first side plate 10 and the second side plate 11, and connect the first side plate 10 and the second side plate 11 at three locations in the reel unit 1, e.g., at the rear, the bottom, and the top thereof. Like with the first side cover 13, the outer circumferences of the connection members 12 are machined integrally with the first side plate 10 and the second side plate 11. The rod attachment leg 4 is fixed to the bottom connection member 12, and a thumb rest 17 made of a synthetic resin is mounted to the rear connection member 12.

As shown in FIGS. 1 and 3, the handle assembly 2 includes a handle arm 6 non-rotatably mounted to an end of the handle shaft 30, a handle knob 7 rotatably mounted to one end of the handle arm 6, and a knob shaft 8 that is made of metal and that serves to rotatably mount the handle knob 7 to the handle arm 6. The handle arm 6 is a flat metal member that extends radially outward from the handle shaft 30. As shown in FIG. 2, the handle arm 6 is non-rotatably engaged with a chamfered portion 30a formed at the tip of the handle shaft 30, and is detachably fixed to the handle shaft 30 with a fixing nut 30b.

Figure 4:
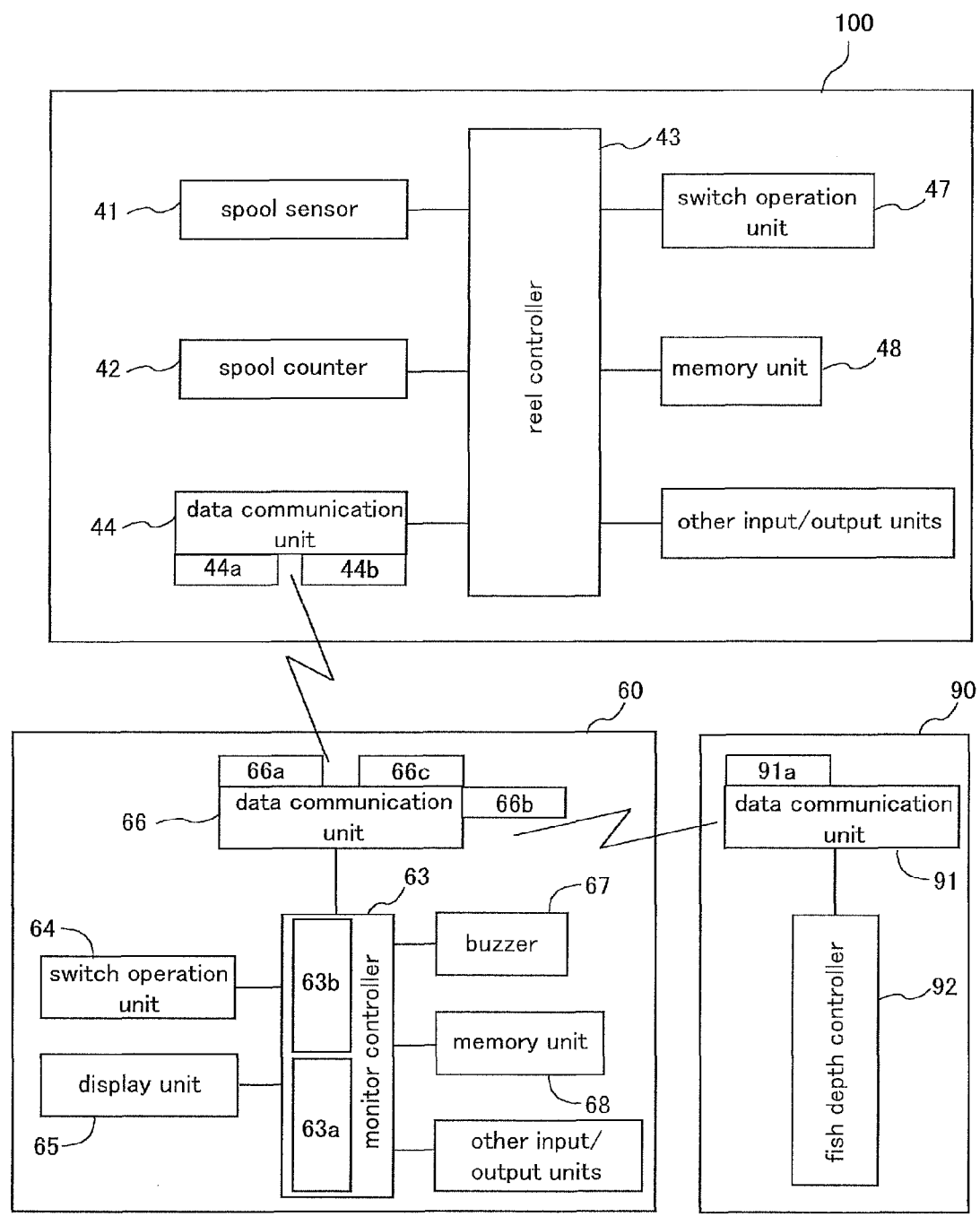
FIG. 4 is a control block diagram of the fishing reel and the fishing data display device in accordance with the first embodiment of the present invention.

A reel controller 43 shown in FIG. 4 that controls various interfaces that include the data communications unit 44 and the switch operation unit 47 is provided in the interior of the second side cover 14 of the reel unit 1. A battery 46 (see FIG. 3) such as an electricity storage battery and the like that serves to supply electricity to things such as a spool sensor 41 and a spool counter 42, the data communication unit 44, and the reel controller 43, is provided in the interior of the second side cover 14.

The reel controller 43 includes a microcomputer that includes a CPU, RAM, ROM, an I/O interface, and the like that are disposed inside the second side cover 14. The reel controller 43 will execute various control operations of the data communication unit 44 and the like in accordance with a control program. As shown in FIG. 4, the reel controller 43 is connected to a spool sensor 41 and a spool counter 42 which serve to detect the rotational direction and number of rotations (rotational position data) of the spool 15, the data communication unit 44, the switch operation unit 47, a memory unit 48, and other input/output units.

The spool sensor 41 is composed of two lead switches that are aligned from front to rear. The lead switches detect two magnets mounted on a magnet wheel. By counting the detection pulses with the spool counter 42, the number of rotations of the reel can be detected. In addition, the rotational direction of the spool 15 can be detected based on whether the lead switches generated a detection pulse.

The spool counter 42 calculates the number of times the spool sensor 41 is turned on and off, and rotational position data related to the number of spool rotations is obtained by means of this calculated value. The number of rotations calculated by the spool counter 42 will decrease when the spool 15 rotates normally (rotates in the line releasing direction), and will increase when the spool 10 rotates in the opposite direction.

The reel controller 43 will perform various types of control of the data communication unit 44 and the like, and will perform a water depth calculation process that calculates terminal tackle water depth data. The water depth calculation process will convert the number of rotations of the spool 15 to terminal tackle water depth data by correlating the number of rotations of the spool 15 counted by the spool counter 42 with map data stored in the memory unit 48. The terminal tackle water depth data obtained in this manner is sent to the data communication unit 44 as numerical value data.

As shown in FIG. 4, the data communication unit 44 is capable of transmitting and receiving various types of data to and from a data communication unit 66 of a fishing data display device 60 arranged on the exterior of the fishing reel 100. The data communication unit 66 includes a first wireless reception unit 66a that communicates with the first wireless transmission unit 44a, a second wireless reception unit 66b that communicates with a wireless transmission unit 91a of a fish finder 90 (described below) and a third wireless transmission unit 66c that communicates with a third wireless reception unit 44b of the data communication unit 44. The data communication unit 44 is a low output device that transmits and receives in a comparatively narrow range that can be used on board a boat that employs a wireless system such as UWB (ultra wide band) wireless or the like. The data communication unit 44 can transmit terminal tackle water depth data obtained from the spool sensor 41 and the spool counter 42 to the data communication unit 66 of the fishing data display device 60. In addition, the data communication unit 44 can receive command data transmitted from the data transmission unit 66 of the fishing data display device 60, and transmit various data based upon this command data via the reel controller 43. As shown in FIG. 1 and FIG. 3, the entire data communication unit 44, including an antenna (also known as a data collection device) that is exposed on the exterior of the second side cover 14, is covered by a case member made of a synthetic resin.

The switch operation unit 47 is a pressure type toggle switch that serves to turn the data communication unit 44 on and off. When the switch operation unit 47 is turned on, wireless communication is possible, and when the switch operation unit 47 is turned off, wireless communication is not possible. The switch operation unit 47 is arranged near the rear of the data communication unit 44 on the upper portion of the second side cover 14. In addition, the data communication unit 44 includes a power save mode in which power is automatically turned off when the data communication unit 44 has not transmitted or received data for a long period of time. In this situation, the data communication unit 44 can be turned off without turning the switch operation unit 47 off.

The memory unit 48 is composed of a non-volatile memory such as an EEPROM or the like, and stores various data such as map data and the like used during line length calculations.

As shown in FIG. 4, the fishing data display device 60 is capable of displaying fish location echoes that show the water depth of the bottom of the fishing location and the position of schools of fish obtained from the fish finder 90. The fishing data display device 60 serves to superimpose terminal tackle water depth data obtained from the fishing reel 100 with the water depth of the bottom and the fish location displayed with echoes.

Figure 5:
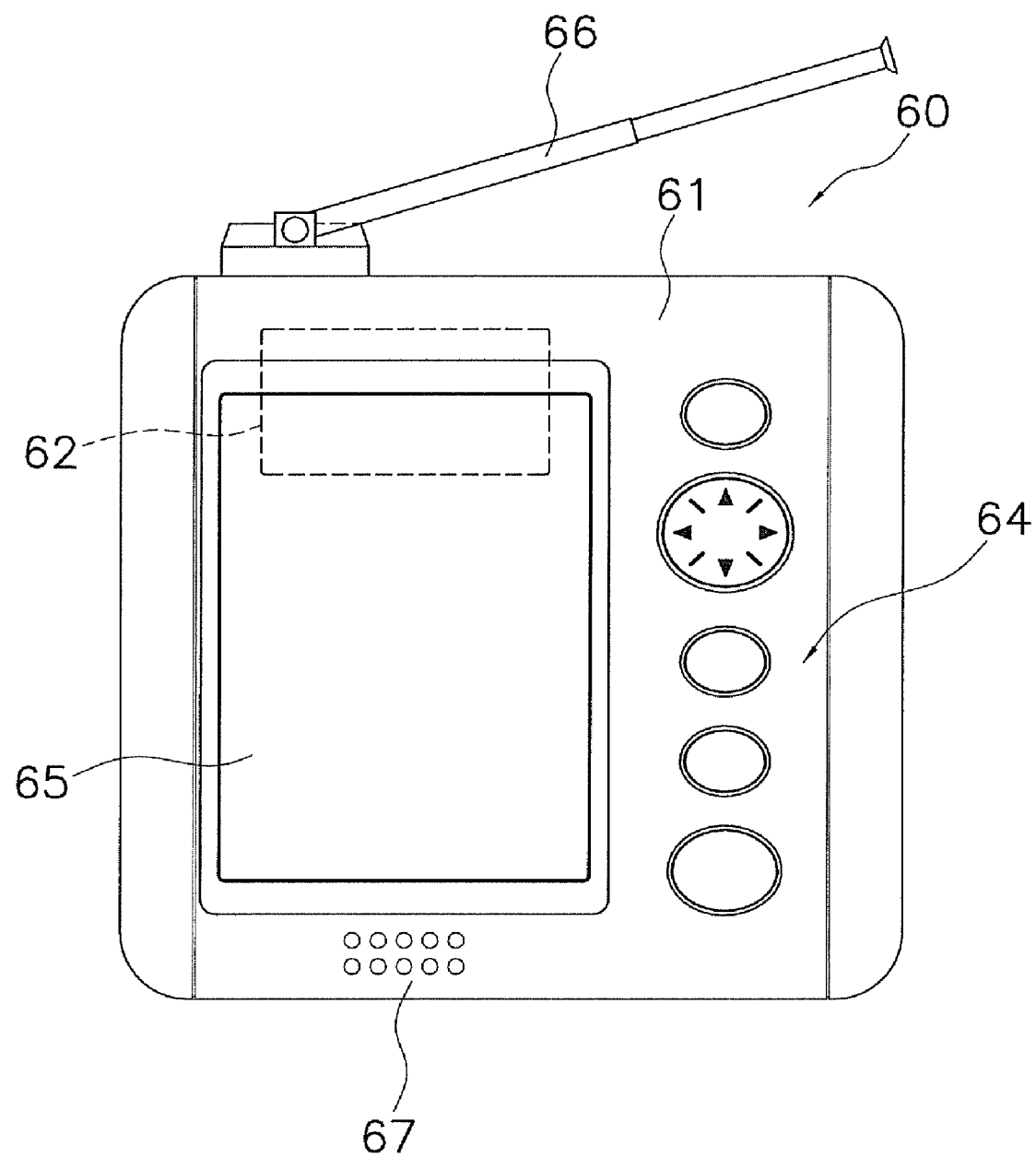
FIG. 5 is a plan view of the fishing data display device in accordance with the first embodiment of the present invention.

As shown in FIG. 5, the fishing data display device 60 includes a generally rectangular body member 61, a data communication unit 66 that is arranged on the upper portion of the body member 61, a display unit 65 composed of a liquid crystal display that is mounted on the body member 61, and a switch operation unit 64 composed of a plurality of operation buttons arranged on the right side of the display unit 65.

As shown in FIG. 5, a battery 62 such as an electricity storage element or the like that serves to supply electricity to the data communication unit 66 and the like is arranged in the upper portion of the inside of the fishing data display device 60, and a buzzer 67 is arranged in the lower portion of the inside of the fishing data display device 60 and serves to aurally notify one of various data. In addition, as shown in FIG. 4, a monitor controller 63 that performs various control functions is arranged in the fishing data display device 60. The monitor controller 63 includes a first display unit 63a and a second display unit 63b. The first display unit 63a is configured to display water depth data from the reel 1 on display unit 65, and the second display unit 63b is configured to display data from the fish finder 90 on display unit 65.

The reel controller 43 includes a microcomputer that includes a CPU, RAM, ROM, an I/O interface, and the like arranged in the body member 61. The monitor controller 63 executes, in accordance with a control program, display control operations that display data from the fishing reel 100 and the fish finder 90 on the display unit 65, and various types of control operations for the data communication unit 66 that transmits various command data to the fishing reel 100. In addition, as shown in FIG. 4, various switches for the switch operation unit 64, the display unit 65, the data communication unit 66, the buzzer 67, the memory unit 68, and other input/output units, are connected to the monitor controller 63.

As shown in FIG. 5, the plurality of buttons of the switch operation unit 64, such as a cursor key that moves a cursor up, down, left, and right over various setting items, a power button that turns the display of the display unit 65 on and off, a setting button that sets various settings, a screen switch button, and the like, are vertically arranged.

Figure 6:
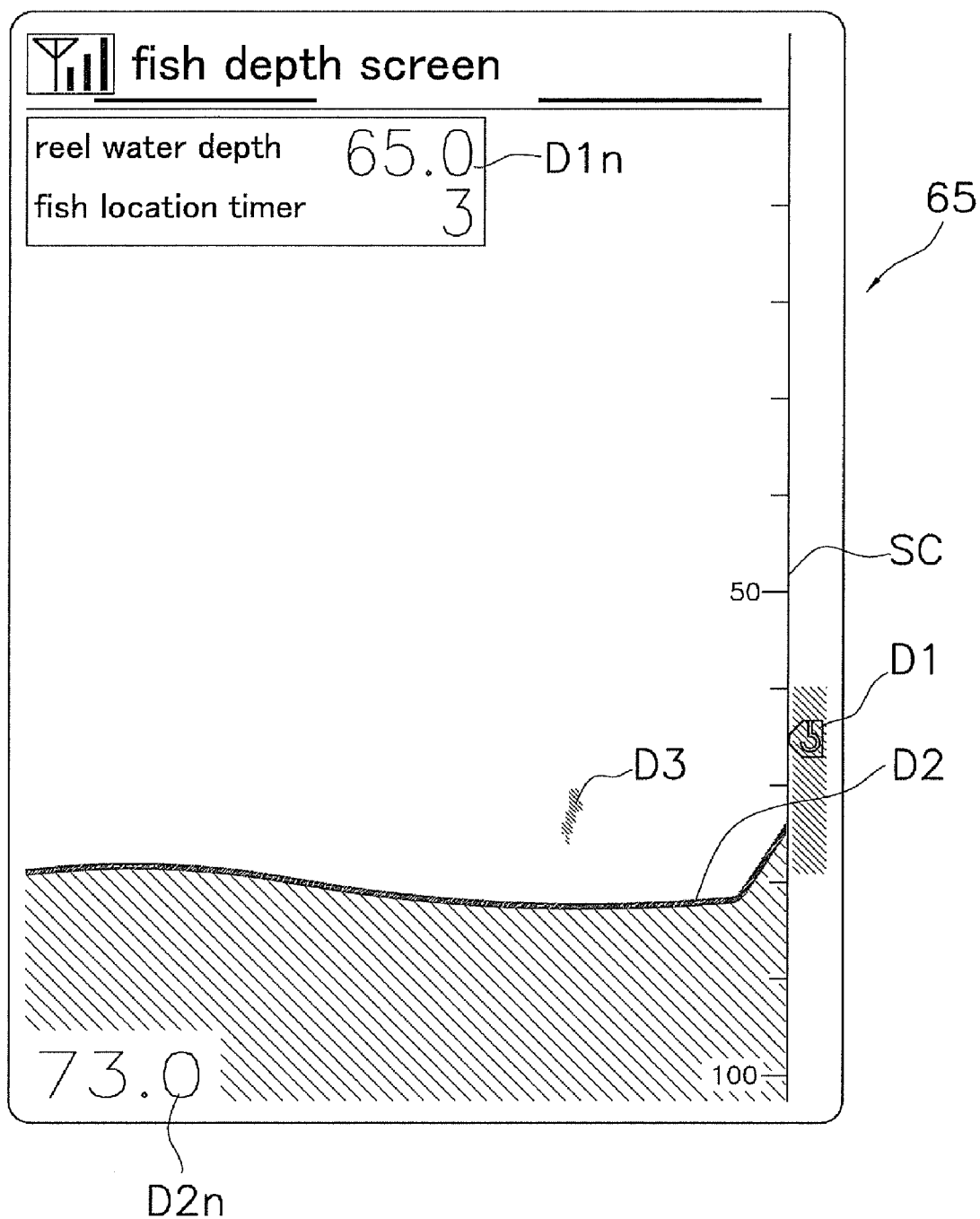
FIG. 6 is a figure illustrating a screen of a display unit of the fishing data display unit in accordance with the first embodiment of the present invention.

As shown in FIG. 5, the display unit 65 is for example a dot matrix type of liquid crystal display, and is capable of displaying large amounts of various data. As shown in an enlarged view in FIG. 6, the display unit 65 displays a water depth scale SC on the right end of the screen. In addition, the display unit 65 also displays terminal tackle water depth data D1 obtained from the fishing reel 100 on the right side of the scale SC, in a position that corresponds to the water depth and with, for example, a hook shaped object that symbolizes the terminal tackle. In addition, sea bottom water depth data D2 and fish location water depth data D3 that are received from the fish finder 90 are chronologically displayed with echo data images in positions corresponding to the water depth on the left side of the scale SC. Furthermore, a numerical value D2n of the sea bottom water depth D2 will be displayed on the lower left of the screen, and a numerical value D1n of the water depth data D1 will be displayed on the upper left of the screen.

As shown in FIG. 4, the data communication unit 66 is capable of wirelessly transmitting and receiving various data between the data communication unit 44 of the fishing reel 100, and the data communication unit 91 of the fish finder 90. The data communication unit 66 is a low output device that uses a wireless method such as UWB (Ultra Wide Band) to transmit and receive between the data communication unit 44 of the fishing reel 100 and the data communication unit 91 of the fish finder 90 in a relatively narrow range capable of being used on board a boat. The data communication unit 66 is set so that the communication channel thereof will be different from that of the data communication unit 44 and the data communication unit 91, thereby preventing interference with the data communication unit 44 and the data communication unit 91. The data communication unit 66 receives data such as terminal tackle water depth data from the data communication unit 44 of the fishing reel 100, and transmits various command data to the data communication unit 44 of the fishing reel 100. In addition, the data communication unit 66 can communicate with the data communication unit 91 of the fish finder 90, and receives data such as the water depth of the bottom and the location of fish schools. As shown in FIG. 5, the data communication unit 66 is arranged on the upper portion of the main member 61, and includes a metal antenna that can be extended, retracted, and rotated.

As shown in FIG. 5, the buzzer 67 includes a speaker on the lower portion of the main member 61, and serves to generate various types of alarm sounds and operational sounds.

The memory unit 68 is composed of a non-volatile memory such as an EEPROM or the like, is capable of storing various data received from the fishing reel 100 and the fish finder 90, and thus can reference past data via the monitor controller 63 and display a history of past data.

The fish finder 90 is a device that gathers data illustrating the location of fish, the condition of a school of fish, and the direction of movement of a school of fish, and as shown in FIG. 4, includes a data communication unit 91 that wirelessly transmits fish school data to the data communication unit 66 of the fishing data display device 60, and a fish depth controller 92 that is connected to the data communication unit 91 and performs various control functions. The data communication unit 91 is a low output device that transmits and receives in a comparatively narrow range that can be used on board a boat, and employs a wireless system such as UWB (ultra wide band) wireless or the like. Note that other configurations of the fish finder 90 are the same as a standard configuration, and thus a detailed description of other configurations of the fish finder 90 will be omitted.

When using this type of fishing data display device 60 and fish finder 90 to engage in fishing, the switch operation unit 47 of the fishing reel 100 will be first turned on, and then the data communication unit 44 will be placed into a state in which wireless communication is possible. The power switches of the fishing data display device 60 and the fish finder 90 will also be turned on, various settings will be performed, and the data communication unit 66 and the data communication unit 91 will be placed into a state in which wireless communication is possible. Here, when the data communication unit 44 of the fishing reel 100 and the data communication unit 66 of the fishing data display device 60 are wirelessly connected, the data communication unit 44 and the data communication unit 66 will be in a stand-by state in which they wait for various control commands. Then, when a command (a transmission request) to transmit terminal tackle water depth data from the data communication unit 66 to the data communication unit 44 is transmitted, the terminal tackle water depth data will be transmitted from the data communication unit 44 to the data communication unit 66, and the terminal tackle water depth data will be displayed on the display unit 65 via the monitor controller 63.

Next, the clutch lever 40 of the fishing reel 100 is moved to the off position, and the terminal tackle is lowered into the water. At this point, the spool 15 is rotated in the line release direction, and the number of rotations of the spool 15 is calculated by the spool sensor 41 and the spool counter 42. Then, the number of rotations of the spool 15 is converted into terminal tackle water depth data by means of a water depth calculation process of the reel controller 43. The terminal tackle water depth data is transmitted from the data communication unit 44 to the data communication unit 66, and is displayed in real time on the display unit 65 via the monitor controller 63.

On the other hand, fish school data obtained from the fish finder 90 is transmitted from the data communication unit 91 to the data communication unit 66, and is graphically displayed together with the terminal tackle water depth data on the display unit 65 via the monitor controller 63.

When the terminal tackle arrives at the bottom, the clutch lever 40 will be moved to the on position, and the fisherman will refer to the display unit 65 of the fishing data display device 60 while winding up the fishing line in order to position the terminal tackle in a location where fish are present. When the line winding operation is performed, in order to lure fish, the fishing rod and reel are repeated jerked upward and the fishing line is quickly reeled in, i.e., jigging is performed. When jigging is performed so that the terminal tackle is positioned above the point where fish are located, the clutch lever 40 will again be moved to the off position, and the terminal tackle will be lowered back to the bottom. Next, the clutch lever 40 will again be moved to the on position, and the fisherman will refer to the fish location on the display unit 65 while repeatedly performing jigging in a range that includes the fish location. Then, when a fish is hooked, the jigging will be stopped, a winding operation will be performed up to the water surface, and the fish will be pulled out of the water. The terminal tackle water depth data during this series of operations is sequentially transmitted from the data communication unit 44 to the data communication unit 66, and is displayed together with the fish school data on the display unit 65. Here, by displaying the terminal tackle water depth data on the display unit 65, the terminal tackle can be reliable positioned where fish are located, and thus it will be easy to hook fish.

Because the data communication unit 44 capable of wirelessly outputting terminal tackle water depth data to the data communication unit 66 of the fishing data display device 60 is arranged on the fishing reel 100, the size of the fishing reel 100 can be kept small, and the terminal tackle water depth can be determined. Furthermore, because it will no longer be necessary to provide a cord between the fishing reel 100 and the fishing data display device 60 as in the prior art, jigging can be easily performed.

Alternate Embodiments

Figure 7:
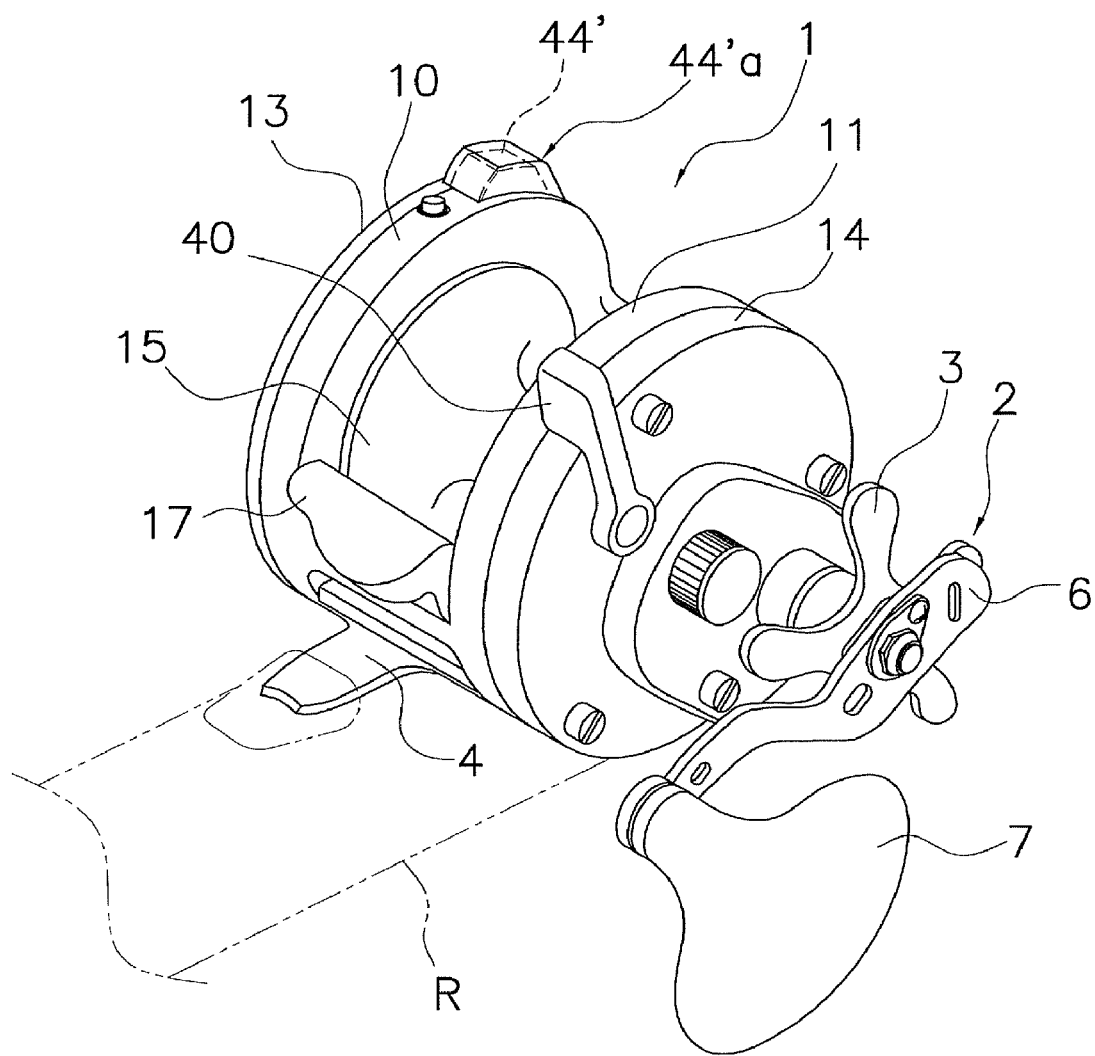
FIG. 7 is a an oblique view of a fishing reel in accordance with the alternate embodiment (c) of the present invention.
Figure 8:
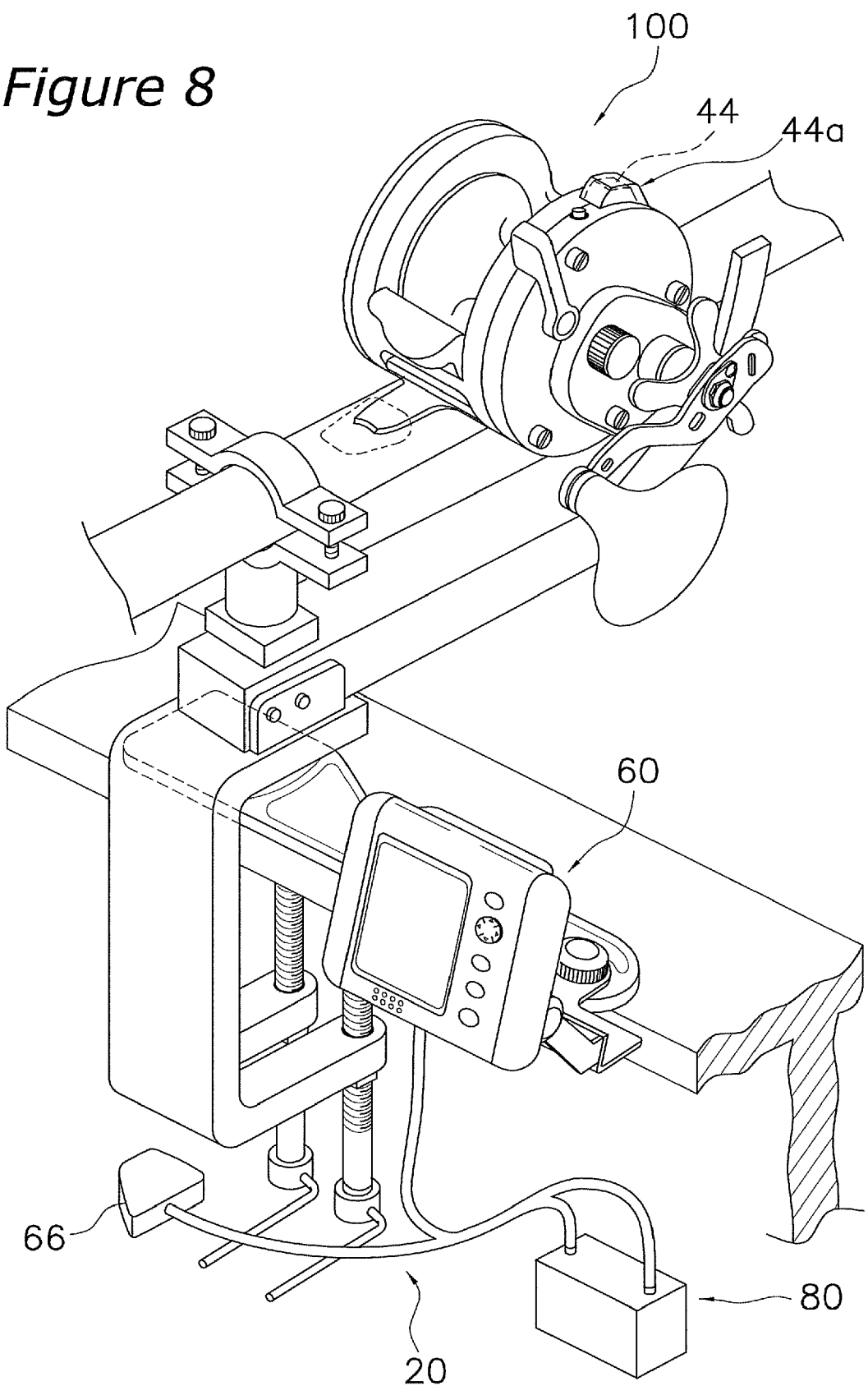
FIG. 8 is an oblique view of the fishing reel and the fishing data display device in accordance with the alternate embodiment (j) of the present invention.

Referring now to FIGS. 7-8, a fishing reel and a fishing data display device in accordance with alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

(a) In the aforementioned embodiment, the fishing data display device 60 was described as an example of a display device arranged on the exterior of the fishing reel 100. However, other terminals having a display unit may be used, such as a portable telephone, a portable game device, a PDA (a personal portable data terminal), a notebook PC, or the like. In addition, the fishing data display device 60 displays data obtained from the fish finder 90, but can instead be designed to display data from a Global Position System (GPS) mounted on the fishing boat. Or, the fishing data display device 60 may be designed to display only data obtained from the fishing reel 100. In addition, the fishing data display device 60 may be configured so that it is wirelessly connected to a plurality of fishing reels 100, and displays various data respectively obtained from the plurality of fishing reels 100. Furthermore, the display device provided on the exterior of the fishing reel 100 may be a small fish finder 90 capable of wirelessly communicating with the fishing reel 100.

(b) In the aforementioned embodiment, the battery 46 such as an electricity storage element or the like that supplies electricity to the data communication unit 44 of the fishing reel 100 is arranged on the inside of the second side cover 14. However, the battery 46 is not limited to this. For example, a button battery mounted on the interior of the reel unit 1 (at least any of the connection members 12, the first side cover 13, and the second side cover 14) may be exchanged, or a solar battery may be installed on the exterior of the reel unit 1 to supply electricity. In addition, a cord may be connected from a battery arranged on the exterior of the reel unit 1 to supply electricity. Furthermore, an electric generator that generates electricity by means of the rotation of the spool 15 may also be provided so that electricity is supplied from this electric generator.

(c) In the aforementioned embodiment, the data communication unit 44 is arranged on the front of the second side cover 14 of the reel unit 1. However, as shown in FIG. 7, the data communication unit 44' may be arranged on the first side cover 13 of the reel unit 1. In addition, the data communication unit 44' is arranged so that it emerges from the second side cover 14. However, the data communication unit 44 may be accommodated in the interior of the second side cover 14, or may be detachable from the second side cover 14. Furthermore, the data communication unit 44 is covered with a case member made of a synthetic resin. However, the data communication unit 44 is not limited to this, and may for example be a metal directional antenna that can be extended, retracted, and rotated.

(d) In the aforementioned embodiment, the wireless system of the data communication unit 44 employed UWB (ultra wide band) wireless. However, the wireless system is not limited to this, and may employ another wireless system such as Bluetooth, a special low power standard wireless, infrared wireless, or the like. In addition, the data communication unit 44 both transmits and receives data, but may be designed so as to only transmit data. Note that in this situation, the data communication unit 66 of the fishing data display device 60 may be designed so as to only receive data.

(e) In the aforementioned embodiment, the switch operation unit 47 that turns the data communication unit 44 on and off is arranged on the upper portion of the second side cover 14 of the fishing reel 100. However, the switch operation unit 47 may be arranged on the side of the second side cover 14 or on the first side cover 13. In addition, the switch operation unit 47 may not be provided on the fishing reel 100, the switch operation unit 64 of the fishing data display device 60 may be designed so as to turn the data communication unit 44 on and off, and the switch operation unit 64 may be arranged on both the fishing reel 100 and the fishing data display device 60. Furthermore, the switch operation unit 47 is not limited to a pressure type of toggle switch, and may, for example, be a slide-type-switch having a waterproof construction.

(f) In the aforementioned embodiment, the battery 62 such as an electricity storage element or the like that supplies electricity to the data communication unit 66 of the fishing data display device 60 is arranged on the interior of the body member 61. However, the battery 62 is not limited to this. For example, a button battery mounted on the interior of the body member 61 may be exchanged, or a solar battery may be installed on the exterior of the body member 61 to supply electricity. In addition, a cord may be connected from a battery arranged on the exterior of the reel unit 1 to supply electricity. Furthermore, an electric generator that generates electricity by means of the rotation of the spool 15 may also be provided so that electricity is supplied from this electric generator. Moreover, as shown in FIG. 8, a cord 20 may be connected from a battery 80 arranged on the exterior of the body member 61 to supply electricity.

(g) In the aforementioned embodiment, the data communication unit 66 is arranged on the upper portion of the body member 61, but is not limited to this. In addition, the data communication unit 66 is not limited to a metal directional antenna that can be extended, retracted, and rotated, and may be covered with a case member made of a synthetic resin. Furthermore, the wireless system of the data communication unit 66 employed UWB (ultra wide band) wireless. However, the wireless system is not limited to this, and may employ another wireless system such as Bluetooth, a special low power standard wireless, infrared wireless, or the like. In addition, in the aforementioned embodiment, the data communication unit 44 of the fishing reel 100 and the data communication unit 91 of the fish finder 90 use the same wireless system, but may use respectively different wireless systems.

(h) In the aforementioned embodiment, the data communication unit 44 of the fishing reel 100 wirelessly outputs terminal tackle water depth data. However, the data that is output is not limited to this. For example, temperature data obtained from a temperature sensor that detects heat generation from a drag mechanism may be output. This type of temperature sensor is for example arranged directly on the drag mechanism or on the reel unit 1 and near the drag mechanism, and is capable of measuring drag temperature data with numerical values. The drag temperature data can be transmitted to the data communication unit 66 of the fishing data display device 60, by means of the data communication unit 44 via the reel controller 43. Then, the data communication unit 66 will display the received drag temperature data on the display unit 65 via the monitor controller 63. In addition, when the drag temperature data exceeds a predetermined temperature range, a warning may be displayed on the display unit 65, and the buzzer 67 may generate a sound as an alarm sound. Here, by arranging a temperature measurement means that detects heat generated from the drag mechanism, the temperature of the drag mechanism and the reel unit to which the heat from the drag mechanism is conducted can be determined without touching the reel.

In the aforementioned embodiment, the buzzer 67 that generates various alarm sounds and operational sounds is arranged on the fishing data display device 60. However, the buzzer 67 may be designed to generate sound when a fish is hooked. For example, a vibration sensor that detects whether or not a fish has been hooked is arranged on the fishing reel 100, and hook data when a fish has been hooked will be transmitted from the data communication unit 44 of the fishing reel 100 to the data communication unit 66 of the fishing data display device 60. Then, when the data communication unit 66 of the fishing data display device 60 receives the hook data from the data communication unit 44 of the fishing reel 100, the buzzer 67 will be made to generate a predetermined sound via the monitor controller 63. Note that the sound of the buzzer 67 can be set to be a simple click sound, a long buzzer sound, a melody, or the like. In addition, in the event that a plurality of fishing reels 100 are connected, which fishing reel 100 has hooked a fish can be identified by setting the volume and the type of sounds made by the buzzer 67 to be different. On the other hand, in the event that the data communication unit 66 of the fishing data display device 60 is configured to receive hook data from the data communication unit 44 of the fishing reel 100, not only can the hook data be announced with the buzzer 67, but the hook data can also be displayed on the display unit 65 and can be stored in the memory unit 68. Note that the hook data may be expanded with various data such as the date the fish was hooked, the amount of time until the fish was hooked, the amount of time taken for line casting and line retrieval, and the like.

(j) In the aforementioned embodiment, the data communication unit 66 of the fishing data display device 60 is arranged on the upper portion of the body member 61 of the fishing data display device 60. However, as shown in FIG. 8, a transmission/receiving unit of the data communication unit 66 may be arranged on a branched end portion of the cord 20 that connects the fishing data display device 60 and the battery 80. In addition, if the data communication unit 66 is detachable from the cord 20, other fishing reels can be connected to the branched end portion of the cord 20. Note that the cord 20 includes a power line that serves to supply electricity from the battery 80 to the fishing data display device 60, and a communication line that connects the data communication unit 66 of the branched end portion and a monitor controller (not shown in the figures) inside the body member 61.

(k) In the aforementioned embodiment, the water depth calculation process that calculates the water depth of the terminal tackle is performed by the reel controller 43 of the fishing reel 100. However, the water depth calculation process may be performed by the monitor controller 63 of the fishing data display device 60, or a controller arranged on the exterior of the fishing reel 100 and the fishing data display device 60, e.g., on the cord 20 of Embodiment (j). In addition, the terminal tackle water depth data transmitted from the data communication unit 44 of the fishing reel 100 is a discrete value of the spool counter 42, and the terminal tackle water depth data may calculated in the monitor controller 63 or the controller on the exterior of the fishing reel 100 and the fishing data display device 60.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

According to the present invention, by providing a first wireless transmission unit on a fishing reel that is capable of wirelessly transmitting terminal tackle water depth data, jigging can be easily performed while allowing the fisherman to ascertain the water depth of the terminal tackle.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A fishing data display system that displays a water depth data of a terminal tackle attached to an end of a fishing line, the fishing data display system comprising:
    a data collection device configured to accumulate a water depth data of the sea floor and a water depth data of the fish location;
    a fishing reel including
        a reel unit,
        a spool rotatably mounted on the reel unit for winding the fishing line,
        a water depth measurement unit configured to measure the water depth of the terminal tackle and produce water depth datum, and
        a first data transmission unit disposed inside a case member coupled to an exterior surface of the reel unit, the first data transmission unit being configured to wirelessly transmit the water depth datum; and
    a fishing data display device operatively connected to the fishing reel, the fishing data display device including
        a body member operatively connected to the data collection device,
        a display member mounted on the body member and configured to display a graphical image of the water depth data of the terminal tackle obtained from the fishing reel and display a graphical image of the water depth data of the sea floor and the water depth data of the fish location accumulated by the data collection device, the position of the graphical image of the water depth data of the terminal tackle displayed on the display member being directly associated with the water depth data of the sea floor and the water depth data of the fish location,
        a first data reception unit configured to wirelessly receive the water depth datum from the first data transmission unit of the fishing reel, and
        a monitor controller having a first data display unit configured to display only the water depth datum received by the first data reception unit on the display member.

2. The fishing data display system according to claim 1, wherein
    the monitor controller further having a second data display unit configured to display data obtained from the data collection device.

3. The fishing data display system according to claim 1, wherein
    the data collection device includes a second data transmission unit configured to wirelessly transmit various data.

4. The fishing data display system according to claim 1, wherein
    the fishing data display device further includes a second data reception unit configured to wirelessly receive various data transmitted from the second data transmission unit.

5. The fishing data display system according to claim 1, wherein
    the fishing data display device further includes a third data transmission unit configured to wirelessly transmit various command data.

6. The fishing data display system according to claim 1, wherein
    the fishing reel further includes a third data reception unit configured to wirelessly receive various command data transmitted from the third data transmission unit.

7. The fishing data display system according to claim 5, wherein
    the first data transmission unit is configured to transmit the terminal tackle water depth data of the fishing reel in accordance with the command data transmitted by the third data reception unit.

8. The fishing data display system according to claim 5, further comprising
    a control unit that stores map data, the water depth datum being obtained based on the number of spool rotations and the map data, the control unit being arranged in an interior space of the body member of the fishing data display device.

9. The fishing data display system according to claim 8, wherein
    the fishing data display device further includes
        a cord for supplying electricity, and
        a power supply unit that supplies electricity to the first wireless reception unit,
    the body member being connected to the first data reception unit and the second power supply unit via the cord such that the first data reception unit and the first display unit communicate various data via the cord, and the control unit is provided outside of the body member.

10. The fishing data display system according to claim 1, wherein
    the graphical image of the water depth data of the terminal tackle displayed on the display member is a hook-shaped object.

* * * * *